(12) United States Patent
Kalos et al.

(10) Patent No.: US 7,818,472 B2
(45) Date of Patent: Oct. 19, 2010

(54) REPEAT CCW COUNT ARGUMENT FOR DEVICE COMMAND WORD PROCESSING

(75) Inventors: Matthew Joseph Kalos, Tucson, AZ (US); Beth Ann Peterson, Tucson, AZ (US)

(73) Assignee: International Business Machines Corporation, Armonk, NY (US)

( * ) Notice: Subject to any disclaimer, the term of this patent is extended or adjusted under 35 U.S.C. 154(b) by 246 days.

(21) Appl. No.: 12/189,592

(22) Filed: Aug. 11, 2008

(65) Prior Publication Data

US 2010/0036975 A1 Feb. 11, 2010

(51) Int. Cl.
G06F 3/00 (2006.01)
(52) U.S. Cl. .......................... 710/20; 370/393; 370/479
(58) Field of Classification Search .................. 710/20, 710/30
See application file for complete search history.

(56) References Cited

U.S. PATENT DOCUMENTS

| | | | |
|---|---|---|---|
| 5,459,838 A * | 10/1995 | Coscarella et al. ............. 710/7 |
| 5,517,670 A | 5/1996 | Allen et al. |
| 5,539,918 A * | 7/1996 | Allen et al. .................... 710/33 |
| 6,687,766 B1 | 2/2004 | Casper et al. |
| 6,886,166 B2 * | 4/2005 | Harrison et al. ............. 719/313 |
| 7,103,750 B2 * | 9/2006 | Helsley et al. ............... 711/217 |
| 7,391,735 B2 * | 6/2008 | Johnson ....................... 370/246 |
| 2001/0049743 A1 * | 12/2001 | Phippen et al. ............. 709/237 |
| 2006/0179164 A1 * | 8/2006 | Katibian et al. ................. 710/1 |
| 2007/0061463 A1 * | 3/2007 | Hiramatsu et al. .......... 709/226 |

OTHER PUBLICATIONS

Christopher Milner et al., "Quick Piping: A Fast, High-Level Model for Describing Processor Piplines," Association for Computing Machinery, 2002, pp. 175-184.
Ingrid Verbauwhede et al., "The Happy Marriage of Architecture and Application in Next-Generation Reconfigurable Systems," Association for Computing Machinery, 2004, pp. 363-376.
David Blythe, "The Direct3D 10 System," Association for Computing Machinery, 2006, pp. 724-734.

* cited by examiner

Primary Examiner—Henry W Tsai
Assistant Examiner—Elias Mamo
(74) Attorney, Agent, or Firm—Griffiths & Seaton PLLC

(57) ABSTRACT

A method of packaging a plurality of repeating commands for device command word (DCW) processing in a computer environment having an I/O link handling complex instruction chains for a processing operation is provided. Locate record information is packaged into DCW prefix parameter data. The locate record information includes an intent count argument. The plurality of repeating commands are embedded as a truncated concatenation to the first locate record information. The plurality of repeating commands are identified by redefining the intent count argument for the plurality of repeating commands as a repeat count argument using a flag argument incorporated into the locate record information. The repeat count argument indicates a number of times for a control unit in the computer environment to execute the plurality of repeating commands.

15 Claims, 2 Drawing Sheets

REPEAT CCW COUNT ARGUMENT FOR DEVICE COMMAND WORD PROCESSING

BACKGROUND OF THE INVENTION

1. Field of the Invention

The present invention relates in general to computers, and more particularly to a mechanism for specifying a repeat CCW count parameter for device command word (DCW) processing.

2. Description of the Related Art

Input/output (I/O) operations are used to transfer data between memory and input/output devices of a processing environment. Specifically, data is written from memory to one or more input/output devices, and data is read from one or more input/output devices to memory by executing input/output operations.

To facilitate processing of input/output operations, an input/output subsystem of the processing environment is employed. The input/output subsystem is coupled to main memory and the input/output devices of the processing environment and directs the flow of information between memory and the input/output devices. One example of an input/output subsystem is a channel subsystem. The channel subsystem uses channel paths as communications media. Each channel path includes a channel coupled to a control unit, the control unit being further coupled to one or more input/output devices.

The channel subsystem employs channel command words to transfer data between the input/output devices and memory. A channel command word (CCW) specifies the command to be executed, and for commands initiating certain I/O operations, it designates the memory area associated with the operation, the action to be taken whenever transfer to or from the area is completed, and other options.

During input/output processing, a list of channel command words is fetched from memory by a channel. The channel parses each command from the list of channel command words and forwards a number of the commands, each command in it's own entity, to a control unit (processor) coupled to the channel. The control unit then processes the commands. The channel tracks the state of each command and controls when the next set of commands are to be sent to the control unit for processing. The channel ensures that each command is sent to the control unit in it's own entity. Further, the channel infers certain information associated with processing.

SUMMARY OF THE INVENTION

Processing environments incorporating CCWs have traditionally used unique protocols to transport the CCWs to a control unit. More recent improvements to I/O architectures have featured fibre channel protocols (FCP) for transmitting device command words (DCWs) to a control unit. DCWs may be employed in a channel command word descriptor (CCWD) denoting the multiple commands to be executed by the control unit. The commands are executed independent of the channel, in that status relative to execution of the individual commands is not tracked by the channel. The control unit receives the multiple commands as a single information unit (IU) and has the responsibility of executing the commands in an appropriate manner. By relieving the channel of the responsibility of tracking individual commands, the performance of the channel is significantly enhanced.

A major difference between the traditional and newer protocols is that chains of CCW commands may be extremely large. Indeed, the chains may be never ending by allowing software to dynamically add to a running CCW chain. In contrast, the transport layer in DCW type processing is limited in size. In one embodiment, for example, the layer allows for approximately 240 bytes of DCW data to be transmitted to the control unit in an IU. In this example, 80 bytes of the 240 bytes are reserved for DCW prefix parameters.

Extended count key data (ECKD) channel programs contain an 8-byte prefix CCW with 64 or more bytes of parameter data, followed by another 8-byte CCW for each command executed. Using this format, the number of commands that may be encapsulated in an IU for DCW-type processing is limited. Accordingly, a need exists for a mechanism to efficiently package a larger number of commands in the limited space offered by DCW protocols, allowing for larger channel programs to be encapsulated.

In light of the foregoing, in one embodiment, by way of example only, a method of packaging a plurality of repeating commands for device command word (DCW) processing in a computer environment having an I/O link handling complex instruction chains for a processing operation is provided. Locate record information is packaged into DCW prefix parameter data. The locate record information includes an intent count argument. The plurality of repeating commands are embedded as a truncated concatenation to the locate record information. The plurality of repeating commands are identified by redefining the intent count argument for the plurality of repeating commands as a repeat count argument using a flag argument incorporated into the locate record information. The repeat count argument indicates a number of times for a control unit in the computer environment to execute the plurality of repeating commands.

In an additional embodiment, again by way of example only, a system of packaging a plurality of repeating commands for device command word (DCW) processing in a computer environment having an I/O link handling complex instruction chains for a processing operation is provided. An initiator processor is in communication with a control unit in the computer environment. The initiator processor is adapted to package locate record information into DCW prefix parameter data. The locate record information includes an intent count argument. The plurality of repeating commands are embedded as a truncated concatenation to the locate record information. The plurality of repeating commands are identified by redefining the intent count argument for the plurality of repeating commands as a repeat count argument using a flag argument incorporated into the locate record information. The repeat count argument indicates a number of times for a control unit in the computer environment to execute the plurality of repeating commands.

In still another embodiment, again by way of example only, a computer program product for packaging a plurality of repeating commands for device command word (DCW) processing in a computer environment having an I/O link handling complex instruction chains for a processing operation is provided. The computer program product comprises a computer-readable storage medium having computer-readable program code portions stored therein. The computer-readable program code portions comprise a first executable portion for packaging locate record information into DCW prefix parameter data, the locate record information including an intent count argument, and a second executable portion for embedding the plurality of repeating commands as a truncated concatenation to the locate record information, the plurality of repeating commands identified by redefining the intent count argument for the plurality of repeating commands as a repeat count argument using a flag argument incorporated into the locate record information, the repeat count argument indicating a number of times for a control unit in the computer environment to execute the plurality of repeating commands.

BRIEF DESCRIPTION OF THE DRAWINGS

In order that the advantages of the invention will be readily understood, a more particular description of the invention briefly described above will be rendered by reference to specific embodiments that are illustrated in the appended drawings. Understanding that these drawings depict only typical embodiments of the invention and are not therefore to be considered to be limiting of its scope, the invention will be described and explained with additional specificity and detail through the use of the accompanying drawings, in which.

DETAILED DESCRIPTION OF THE DRAWINGS

Figure 1:
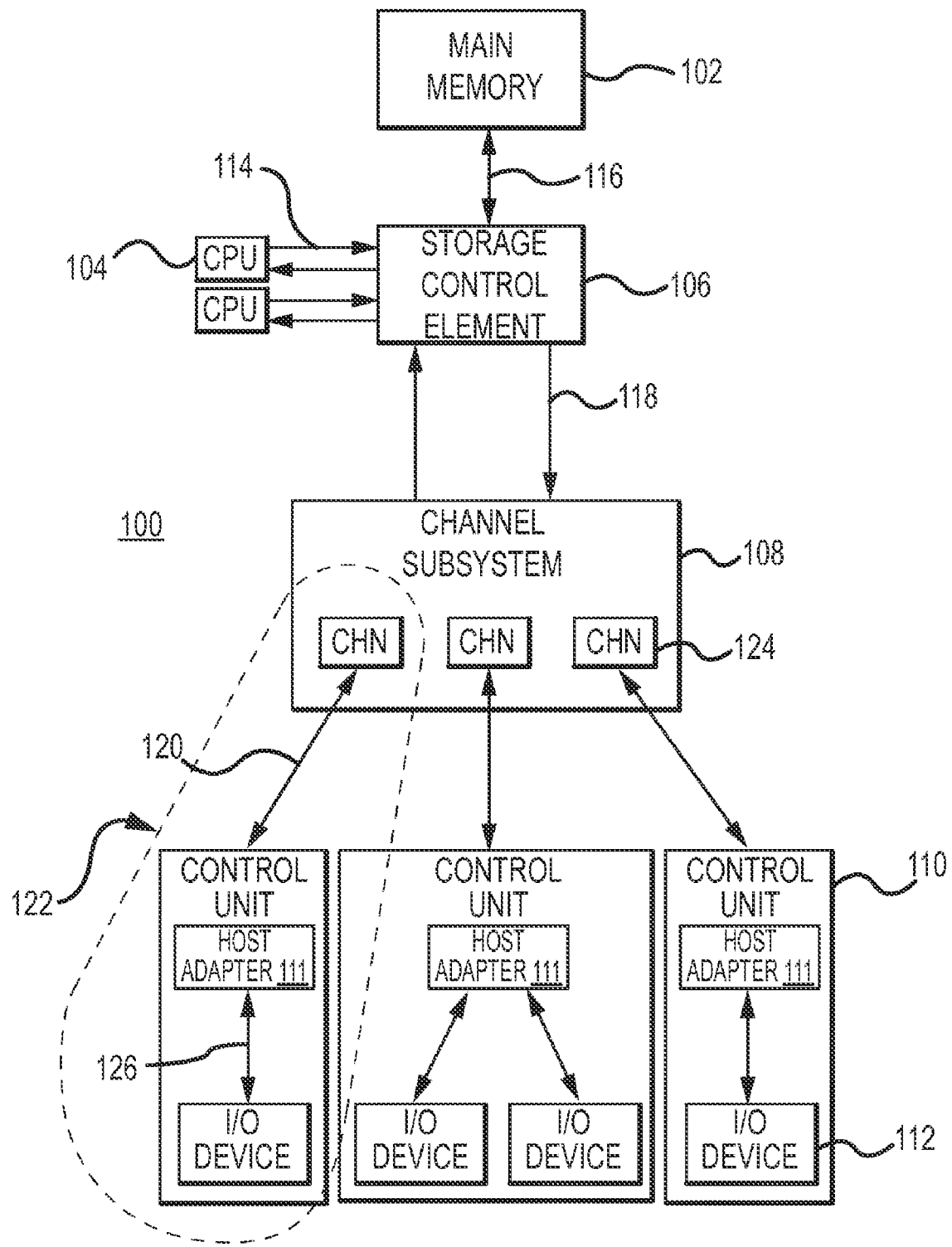
FIG. 1 depicts an exemplary processing environment incorporating and using one or more aspects of the present invention.

One example of a processing environment incorporating and using one or more aspects of the present invention is described with reference to FIG. 1. Processing environment 100 includes, for instance, a main memory 102, one or more central processing units (CPU) 104, a storage control element 106, a channel subsystem 108, one or more control units 110 and one or more input/output (I/O) devices 112, each of which is described below.

Main memory 102 stores data and programs, which are input from input devices 112. Main memory 102 is directly addressable and provides for high-speed processing of data by central processing units 104 and channel subsystem 108.

Central processing unit 104 is the controlling center of environment 100. It contains the sequencing and processing facilities for instruction execution, interruption action, timing functions, initial program loading, and other machine-related functions. Central processing unit 104 is coupled to storage control element 106 via a connection 114, such as a bidirectional or unidirectional bus.

Storage control element 106 is coupled to main memory 102 via a connection 116, such as a bus; to central processing units 104 via connection 114; and to channel subsystem 108 via a connection 118. Storage control element 106 controls, for example, the queuing and execution of requests made by CPU 104 and channel subsystem 108.

Channel subsystem 108 is coupled to storage control element 106, as described above, and to each of the control units via a connection 120, such as a serial link. Channel subsystem 108 directs the flow of information between input/output devices 112 and main memory 102. It relieves the central processing units of the task of communicating directly with the input/output devices and permits data processing to proceed concurrently with input/output processing. The channel subsystem uses one or more channel paths 122 as the communication links in managing the flow of information to or from input/output devices 112. As a part of the input/output processing, channel subsystem 108 also performs the path-management functions of testing for channel path availability, selecting an available channel path and initiating execution of the operation with the input/output devices.

Each channel path 122 includes a channel 124 (channels are located within the channel subsystem, in one example, as shown in FIG. 1), one or more control units 110 and one or more connections 120. In another example, it is also possible to have one or more dynamic switches as part of the channel path. A dynamic switch is coupled to a channel and a control unit and provides the capability of physically interconnecting any two links that are attached to the switch.

Also located within channel subsystem 108 are subchannels (not shown). One subchannel is provided for and dedicated to each input/output device accessible to a program through the channel subsystem. A subchannel (e.g., a data structure, such as a table) provides the logical appearance of a device to the program. Each subchannel provides information concerning the associated input/output device 112 and its attachment to channel subsystem 108. The subchannel also provides information concerning input/output operations and other functions involving the associated input/output device. The subchannel is the means by which channel subsystem 108 provides information about associated input/output devices 112 to central processing units 104, which obtain this information by executing input/output instructions.

Channel subsystem 108 is coupled to one or more control units 110. Each control unit provides the logic to operate and control one or more input/output devices and adapts, through the use of common facilities, the characteristics of each input/output device to the link interface provided by the channel. The common facilities provide for the execution of input/output operations, indications concerning the status of the input/output device and control unit, control of the timing of data transfers over the channel path and certain levels of input/output device control.

Each control unit 110 is attached via a connection 126 (e.g., a bus) to one or more input/output devices 112. Input/output devices 112 receive information or store information in main memory 102 and/or other memory. Examples of input/output devices include card readers and punches, magnetic tape units, direct access storage devices, displays, keyboards, printers, pointing devices, teleprocessing devices, communication controllers and sensor based equipment, to name a few.

One or more of the above components of the processing environment are further described in "IBM®z/Architecture Principles of Operation," Publication No. SA22-7832-04, 5th Edition, September 2005; U.S. Pat. No. 5,461,721 entitled "System For Transferring Data Between I/O Devices And Main Or Expanded Storage Under Dynamic Control Of Independent Indirect Address Words (IDAWS)," Cormier et al., issued Oct. 24, 1995, which is hereby incorporated herein by reference in its entirety. IBM is a registered trademark of International Business Machines Corporation, Armonk, N.Y., USA. Other names used herein may be registered trademarks, trademarks or product names of International Business Machines Corporation or other companies.

Locate record operations are commonly used in conjunction with read and write system commands. For example, a write system command may be chained to a Define Extent and Locate Record commands. In this manner, when a single record is written to an I/O device, the channel subsystem creates and sends a DCW chain to the I/O device's control unit. The DCW chain includes a number of DCWs, such as Define Extent, Locate Record, and Write chained together in this order. The Define Extent and Locate Record commands which precede the Read and Write system commands are referred to as prefix commands. The prefix commands are followed by the prefix parameters described previously.

A locate record command, in one embodiment, specifies the following information in a 16-byte field. Below, each argument is listed accompanied by its respective size:

1 byte LR Operation
1 byte flags
1 byte embedded CCW op code 1 byte intent count/repeat count 4 byte seek argument 5 byte search argument 1 byte sector number 2 bytes transfer length factor In an additional embodiment, the flags and intent count/repeat count arguments may be one bit in size. The above seek and search arguments are related to each other. The seek argument specifies a physical track. The search argument specifies a logical track number and record within the track. In most cases, the seek argument specifies the same track as the search argument. Some applications such as virtual machine operating system (VM)-based minidisks take a physical volume and carve it into smaller logical volumes to be used by guests such as z/OS guests. The guests use the minidisk volumes as if they were real CKD volumes and address count fields in the tracks starting with a logical track number zero. For purposes of the present invention, the seek and search arguments are assumed to have a constant offset value between them.

The one-byte intent count argument may be utilized to encapsulate a number of repeating commands. The intent count may be redefined as a repeat count to indicate how many times to execute the repetitive command. This repeat count argument is described in further detail, following.

Locate record parameter information may be utilized to encapsulate larger channel programs for DCW processing. The larger channel programs may incorporate a number of repeating commands. The repeating commands may be identified by a truncated representation of the commands which is concatenated to the locate record parameter information.

To accomplish such encapsulation, an embedded CCW parameter may be added to the locate record parameters to specify which command is to be executed within a particular locate record domain. The intent count of the locate record command (described previously) may be redefined as a "repeat count" to indicate to the control unit how many times to execute the specified command. A flag may also be added to the parameter data to indicate the new mode of operation.

The repeat count argument may be defined as a one-byte value (similar to the intent count size) described previously. In addition, the flag argument indicating the new operation mode may also be defined as a one-byte value. In one embodiment, this allows for 255 commands to be executed in a single locate record domain.

Figure 2:
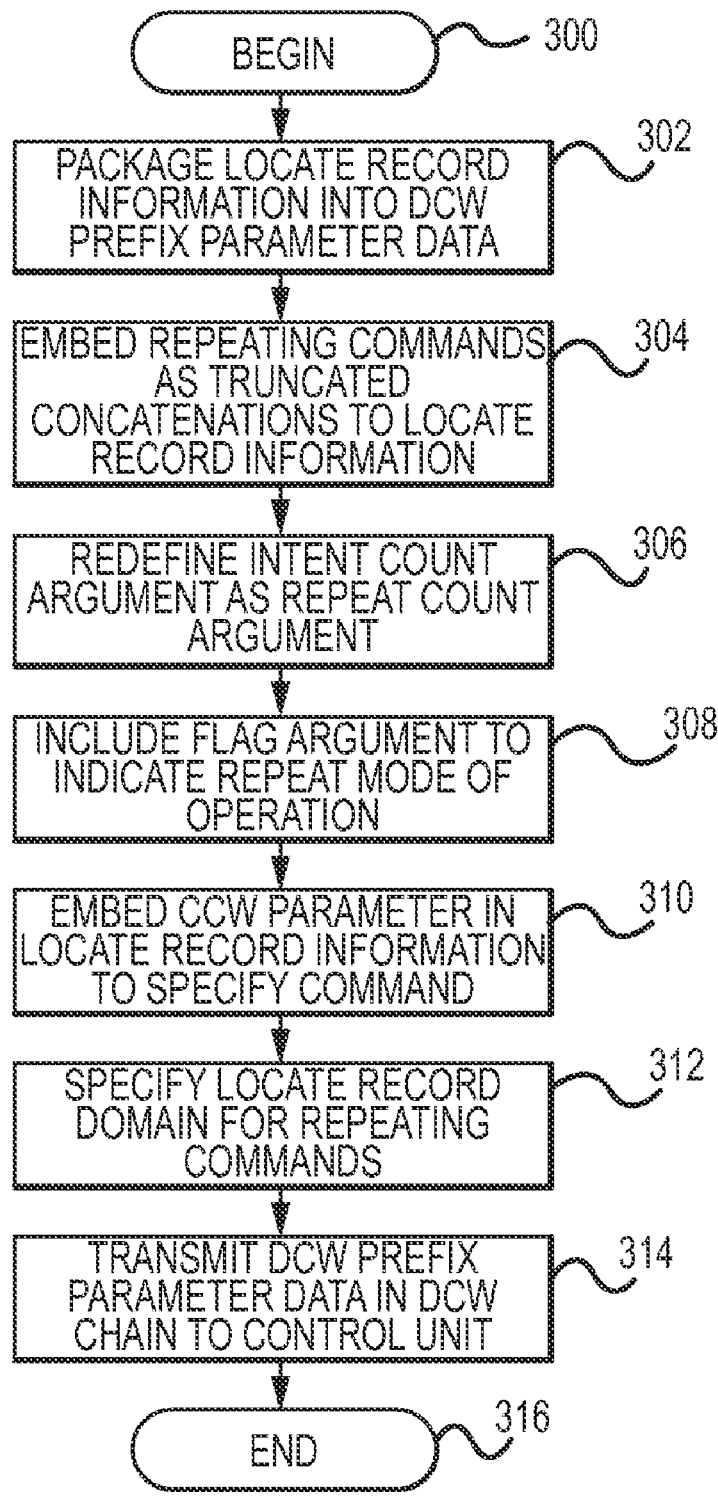
FIG. 2 depicts an exemplary method for packaging a number of repeating commands for DCW processing.

FIG. 2, following, depicts an exemplary method for packaging a number of repeating commands for DCW processing. As one skilled in the art will appreciate, various steps in the following method may be implemented in differing ways and orders to suit a particular application. In addition, the described method may be implemented by various means, such as hardware, software, firmware, or a combination thereof operational on or otherwise associated with the processing environment. For example, the method may be implemented, partially or wholly, as a computer program product including a computer-readable storage medium having computer-readable program code portions stored therein. The computer-readable storage medium may include disk drives, flash memory, digital versatile disks (DVDs), compact disks (CDs), and other types of storage mediums.

Again, FIG. 2 illustrates exemplary packaging of repeating commands for DCW processing. The packaging begins (step 300) with the packaging of locate record information into DCW prefix parameter data (step 302). The locate record information normally includes an intent count argument. As a next step, a CCW parameter embodying a truncated repeating command is concatenated to the locate record information (step 304).

To modify the locate record information and encapsulate the repetitive commands, the intent count argument is redefined as a repeat count argument (step 306). The repeat count argument retains its one-byte value. A flag argument, also having a one-byte value, indicates the repeat mode of operation (step 308). A portion of the locate record information specifies the locate record domain in which the repetitive commands will execute (step 312).

Once the locate record information is modified, the locate record information is transmitted in the DCW prefix parameter data in a DCW chain to a control unit for execution (step 314). The packaging then ends (step 316).

The packaging methodology described above is an enhancement to storage processing architectures, allowing the repetition of processing of a particular CCW without explicitly chaining the CCW. The skilled artisan will appreciate that the CCW commands may include a variety of commands, such as write and read system commands, and search commands, among others.

While one or more embodiments of the present invention have been illustrated in detail, the skilled artisan will appreciate that modifications and adaptations to those embodiments may be made without departing from the scope of the present invention as set forth in the following claims.

What is claimed is:

1. A method of packaging a plurality of repeating commands for device command word (DCW) processing in a computer environment having an I/O link handling complex instruction chains for a processing operation, the method comprising:

packaging locate record information into DCW prefix parameter data, the locate record information including an intent count argument; and embedding the plurality of repeating commands as a truncated concatenation to the locate record information, the plurality of repeating commands identified by redefining the intent count argument for the plurality of repeating commands as a repeat count argument using a flag argument incorporated into the locate record information, the repeat count argument indicating a number of times for a control unit in the computer environment to execute the plurality of repeating commands, wherein embedding the plurality of repeating commands as a truncated concatenation to the locate record information further includes embedding a channel control word (CCW) parameter in the locate record information to specify which command the plurality of repeating commands will repeat.

2. The method of claim 1, further including specifying a locate record domain for the plurality of repeating commands in the DCW prefix parameter data.

3. The method of claim 1, wherein the repeat count argument is defined as one of a one-byte value and a one-bit value.

4. The method of claim 1, wherein the flag argument is defined as one of a one-byte value and a one-bit value.

5. The method of claim 1, wherein the plurality of repeating commands are one of a read system command, a write system command, and a search command.

6. A system of packaging a plurality of repeating commands for device command word (DCW) processing in a computer environment having an I/O link handling complex instruction chains for a processing operation, the system comprising:

an initiator processor in communication with a control unit in the computer environment, the initiator processor adapted for:

packaging locate record information into DCW prefix parameter data, the locate record information including an intent count argument, and embedding the plurality of repeating commands as a truncated concatenation to the locate record information, the plurality of repeating commands identified by redefining the intent count argument for the plurality of repeating commands as a repeat count argument using a flag argument incorporated into the locate record information, the repeat count argument indicating a number of times for a control unit in the computer environment to execute the plurality of repeating commands, wherein the initiator processor is further adapted for embedding a channel control word (CCW) parameter in the locate record information to specify which command the plurality of repeating commands will repeat.

7. The system of claim 6, wherein the initiator processor is further adapted for specifying a locate record domain for the plurality of repeating commands in the DCW prefix parameter data.

8. The system of claim 6, wherein the repeat count argument is defined as one of a one-byte value and a one-bit value.

9. The system of claim 6, wherein the flag argument is defined as one of a one-byte value and a one-bit value.

10. The system of claim 6, wherein the plurality of repeating commands are one of a read system command, a write system command, and a search command.

11. A computer program product for packaging a plurality of repeating commands for device command word (DCW) processing in a computer environment having an I/O link handling complex instruction chains for a processing operation, the computer program product comprising a computer-readable non-transitory storage medium having computer-readable program code portions stored therein, the computer-readable program code portions comprising:

a first executable portion for packaging locate record information into DCW prefix parameter data, the locate record information including an intent count argument;

a second executable portion for embedding the plurality of repeating commands as a truncated concatenation to the locate record information, the plurality of repeating commands identified by redefining the intent count argument for the plurality of repeating commands as a repeat count argument using a flag argument incorporated into the locate record information, the repeat count argument indicating a number of times for a control unit in the computer environment to execute the plurality of repeating commands; and a third executable portion for embedding a channel control word (CCW) parameter in the locate record information to specify which command the plurality of repeating commands will repeat.

12. The computer program product of claim 11, further including a third executable portion for specifying a locate record domain for the plurality of repeating commands in the DCW prefix parameter data.

13. The computer program product of claim 11, wherein the repeat count argument is defined as one of a one-byte value and a one-bit value.

14. The computer program product of claim 11, wherein the flag argument is defined as one of a one-byte value and a one-bit value.

15. The computer program product of claim 11, wherein the plurality of repeating commands are one of a read system command, a write system command, and a search command.

* * * * *